US009137461B2

(12) United States Patent
Troxel (10) Patent No.: US 9,137,461 B2
(45) Date of Patent: Sep. 15, 2015

(54) REAL-TIME CAMERA VIEW THROUGH DRAWN REGION FOR IMAGE CAPTURE

(71) Applicant: Disney Enterprises, Inc., Burbank, CA (US)

(72) Inventor: William Maxwell Troxel, Broomfield, CO (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 13/690,840

(22) Filed: Nov. 30, 2012

(65) Prior Publication Data

US 2014/0152873 A1    Jun. 5, 2014

(51) Int. Cl.
*H04N 5/272* (2006.01)
*H04N 5/232* (2006.01)
*H04N 5/262* (2006.01)
*H04N 1/21* (2006.01)
*H04N 1/387* (2006.01)

(52) U.S. Cl.
CPC .............. *H04N 5/272* (2013.01); *H04N 1/212* (2013.01); *H04N 1/3872* (2013.01); *H04N 5/23293* (2013.01); *H04N 5/2621* (2013.01); H04N 2005/2726 (2013.01)

(58) Field of Classification Search
CPC ... H04N 5/2621; H04N 5/272; H04N 5/2726; H04N 5/23293; H04N 1/3872; H04N 1/212; H04N 2005/2726
USPC ............................................. 348/239, 333.11
See application file for complete search history.

(56) References Cited

U.S. PATENT DOCUMENTS

| | | | |
|---|---|---|---|
| 7,070,277 B2 | 7/2006 | Trumbull | |
| 2005/0046729 A1* | 3/2005 | Taguchi et al. | 348/333.11 |
| 2006/0181630 A1* | 8/2006 | Shioji et al. | 348/333.01 |
| 2007/0057866 A1* | 3/2007 | Lee et al. | 345/1.1 |
| 2008/0036789 A1* | 2/2008 | de Leon | 345/625 |
| 2013/0083215 A1* | 4/2013 | Wisniewski | 348/222.1 |
| 2013/0120602 A1* | 5/2013 | Huang | 348/218.1 |

* cited by examiner

*Primary Examiner* — Paul Berardesca
(74) *Attorney, Agent, or Firm* — Dorsey & Whitney LLP (57) ABSTRACT

Apparatuses and methods related to custom view finders are disclosed. In one embodiment, for example, a method is disclosed which includes defining a view finder region within a first image and saving the image with the view finder into a non-transitory computer readable medium. Additionally, the method includes capturing a second image with a digital camera and compositing the second image into the view finder region of the first image to generate a composite image.

21 Claims, 7 Drawing Sheets

REAL-TIME CAMERA VIEW THROUGH DRAWN REGION FOR IMAGE CAPTURE

TECHNICAL FIELD

The present application is directed to image capture systems and methods. More particularly, the present application is directed to systems and methods for customizing a view finder for image capture.

BACKGROUND

Digital photography has forever changed the way pictures are taken and used. Digital cameras are easy to use and are integrated into many different electronic devices, including cell phones, smart, phones, personal media players, tablet computers, notebook computers, desktop computers, and other devices, making the sharing of images relatively easy when compared to film or printed images.

However, importing photographic images into an artistic application (such as a drawing program) can be a complicated and tedious process, often involving file conversion, photo-import menu selections, and cropping tools. Additionally, integrating an image into an existing piece of art may further include utilization of copy and paste tools and/or additional conversion and file importing menu navigation.

SUMMARY

Apparatuses and methods related to custom view finders are disclosed. One embodiment, for example, may take the form of a method which includes defining a view finder region within a first image and saving the image with the view finder region into a non-transitory computer readable medium. Additionally, the method includes capturing a second image with a digital camera and compositing the second image into the view finder region of the first image to generate a composite image.

Another example may take the form of an apparatus including a processor and a non-transitory computer readable medium communicatively coupled to the processor. The apparatus also includes a camera communicatively coupled to the processor, a display communicatively coupled to the processor, and an input device communicatively coupled to the processor. The apparatus is configured to store a first image, receive user input to define a view finder region in the first image, display the first image with the view finder region on the display, and capture a second image using the camera as a composite of the first image within the view finder region of the first image.

While multiple examples are disclosed, still other examples of the present invention will become apparent to those skilled in the art from the following Detailed Description. As will be realized, the examples are capable of modifications in various aspects, all without departing from the spirit and scope of the examples. Accordingly, the drawings and detailed description are to be regarded as illustrative in nature and not restrictive.

DETAILED DESCRIPTION

The present application is directed to a customizable view finder for image capture. The customizable view finder allows a user to create or select a drawing, photograph, painting, and so forth for use as a view finder for image capture. More particularly, upon selection of an image for use, the user may define one or more regions within the image to serve as a view finder for a digital camera. Additionally, upon capturing a picture, the captured picture and the view finder image are combined into a composite image with the captured image in the view finder region.

Generally, a shape tool or other type of drawing tool may be implemented by a user to define a masking region within an existing artwork through which a live video stream may appear. Once the region is defined (or perhaps while it is being defined), the device's camera may be engaged and the user may see an accordingly masked portion of the camera's field of view, appearing directly inside the artwork in real-time. The user may point the camera freely, seeing how the piece of art may look with different images, textures, and so forth depending on what the camera is aimed at and then determine when to capture an image to freeze an image into the artwork.

In some embodiments, the field of view of the camera may not be limited by the masking, but rather the size and/or dimensions of a captured image may be scaled to fit within the user defined region. As such, in some embodiments a miniature view of the image captured by the camera may be inserted into the existing image or artwork.

As used herein, the term "view finder" may generally refer to an area that a user has defined in an image and in which an image is embedded. That is, it is a region that is to be occupied by a captured image. In some embodiments, the view finder may interchangeably be referred to as a window or a view finder region.

Figure 1A:
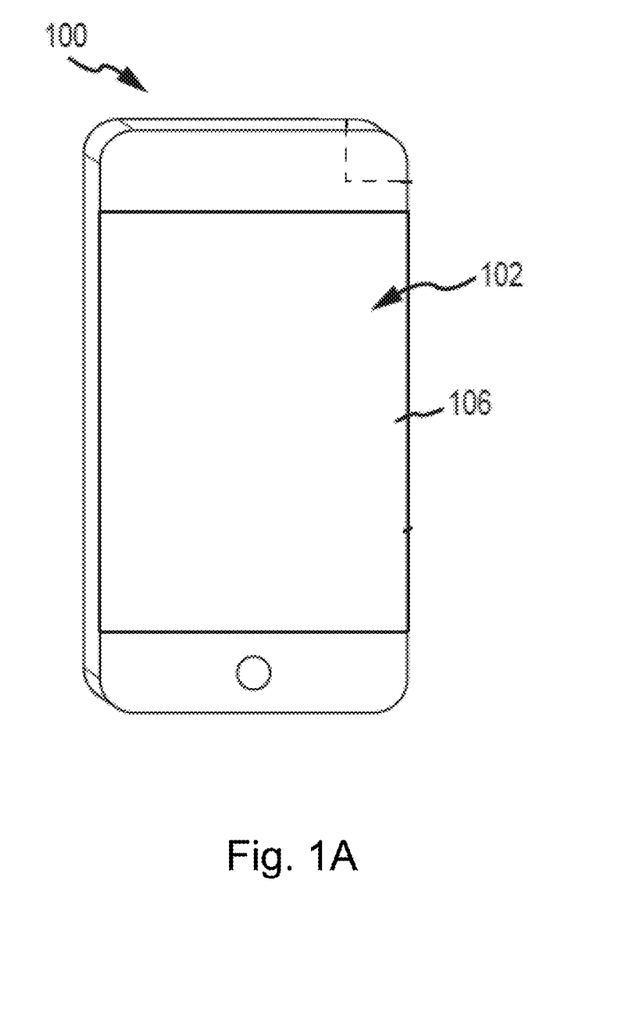
FIG. 1A illustrates a front side of an example electronic device configured for customizable view finders.

Turning to the drawings and referring initially to FIG. 1A, an example electronic device 100 is illustrated as a smart phone, such as the iPhone® manufactured by Apple, Inc. It should be appreciated that the smart phone is provided merely as an example and that the methods, techniques and so forth discussed herein may be implemented in a variety of different devices including: desktop computing devices, notebook computers, tablet computers, cellular phones, media recorder/player devices, electronic readers, and the like. Generally, the device 100 may include a face 102 having a display 106 configured to provide a visual output to a user. In some embodiments, the device 100 may be configured with a touch sensitive display. In particular, the display 106 may allow a user to provide input by touching the display screen. In some embodiments, one or more other input/output (I/O) devices may also be provided.

Figure 1B:
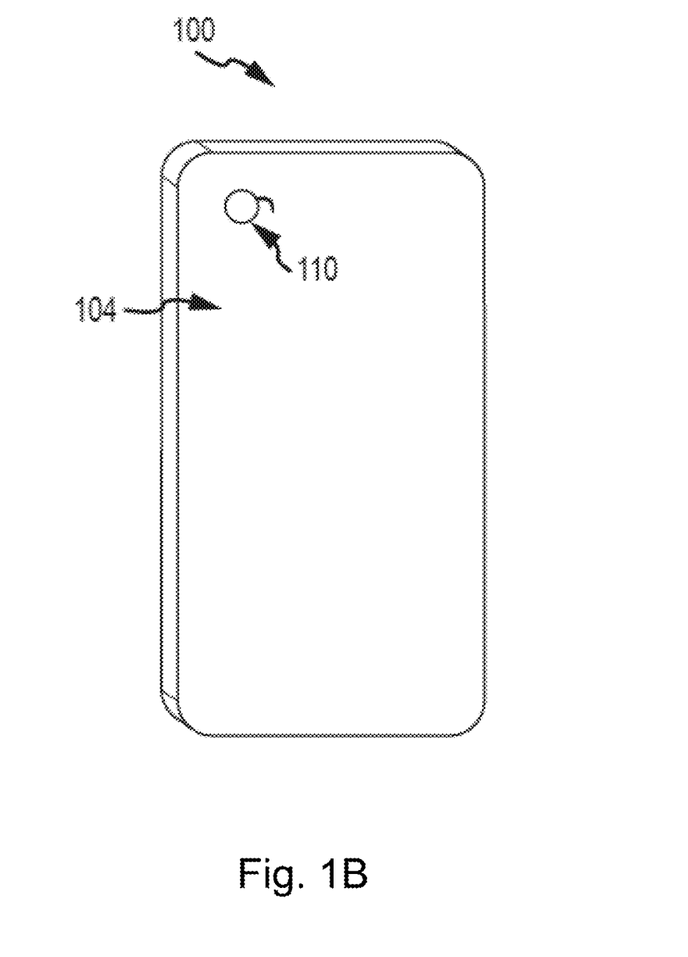
FIG. 1B illustrates a back side of the electronic device of FIG. 1.

Additionally, at least one input device may be located on a rear side 104 of the device 100, as shown in FIG. 1B. For example, a camera 110 may be provided. the camera may generally take any suitable form and may be capable of capturing both still images and video images. As will be discussed in greater detail below. A view finder for the camera may be customized by a user to provide a composite image that includes an image in which the view finder resides.

Figure 2:
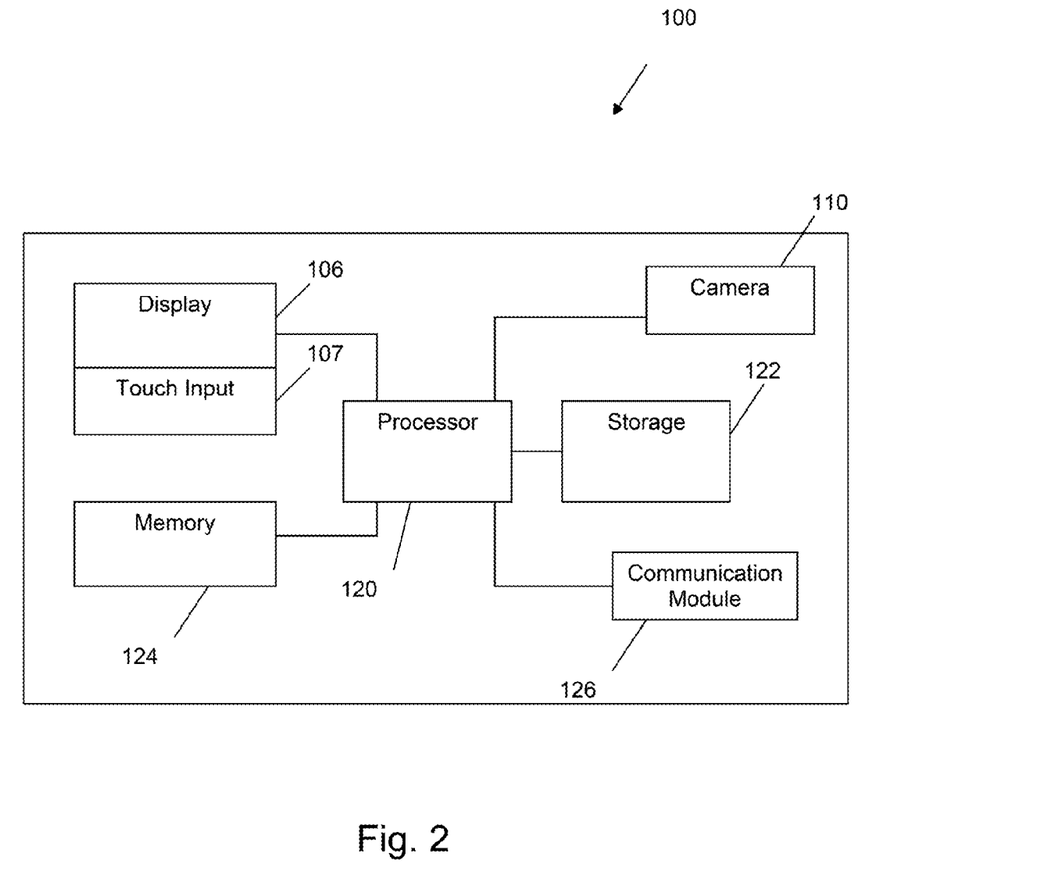
FIG. 2 is an example block diagram of the electronic device of FIG. 1.

The device 100 may include one or more processors 120, as illustrated in the block diagram shown in FIG. 2. A data storage device 122 and a memory device 124 may be coupled to the processor 120. Generally, the storage device 122 may take the form of one or more storage technologies such as flash memory, magnetic disk drives, magnetic tape drives, optical drives, and so forth. The memory device 124 may be implemented in any form of digital random access memory (RAM) including dynamic RAM, synchronous dynamic RAM, and so forth. Generally, the storage device 122 may store operating instructions that are executable by the processor 120 to provide certain functionality. For example, the storage device 122 may store a program that allows a user to define a view finder region within an image and to composite a captured image within the view finder region.

Additionally, the I/O devices, such as the display 106 with touch input 107 and the camera 110 may be coupled to the processor 120 either directly or indirectly. In some embodiments, the processor 120, memory 124 and I/O interfaces may be provided on a single chip as part of a system-on-a-chip (SOC) design, while in other embodiments, the processor, memory and I/O devices may be communicatively coupled together by traces, busses or vias on/in a board. In some embodiments, a dedicated processor may be provided to process images for display on the display 106.

A communication module 126 may also be provided to allow the device 100 to interconnect with networks and/or other devices. In particular, the communication module may include antennas configured to communicate over a WiFi, cellular, BlueTooth®, or communication channel protocol.

Figure 3:
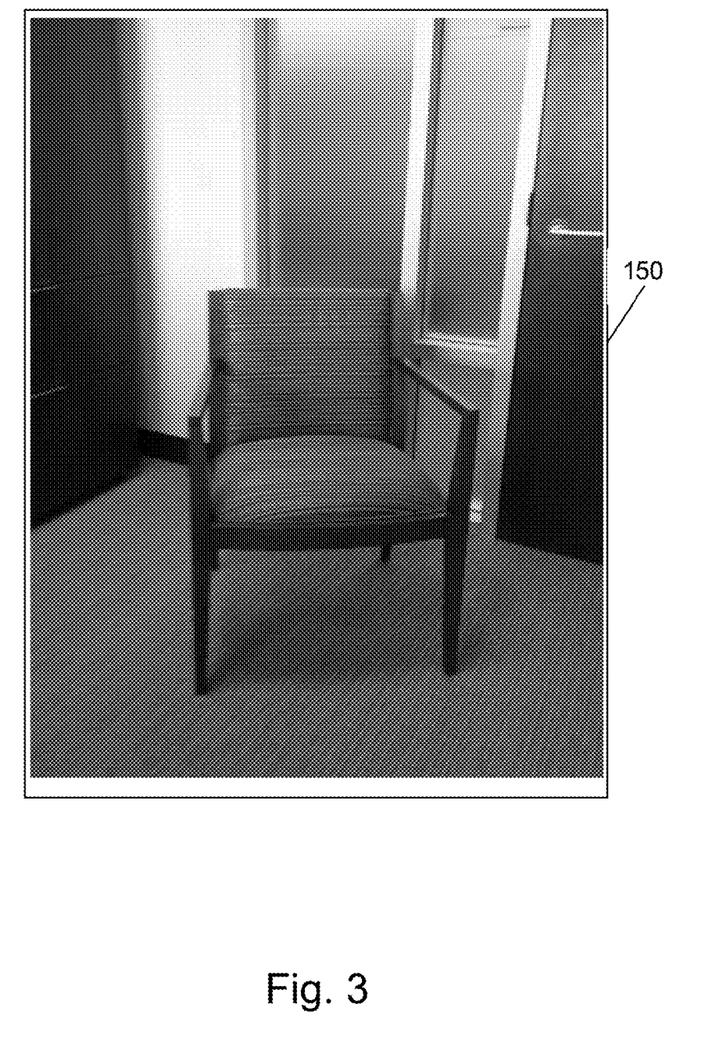
FIG. 3 illustrates a first image in which a customizable view finder may be created.

Turning to FIG. 3, an example image 150 is illustrated. The image 150 may be one that is stored locally in the storage 122 or memory 124. Additionally or alternatively, the image 150 may be one that was captured using the camera 110 or retrieved from a remote source. For example, the image 150 may be retrieved from a server accessed over a local network, the Internet or via a cellular network. In other embodiments, the image 150 may be generated on and/or by the device. For example, a user may create the image using a art based program on the device or another device. Indeed, the image 150 may be from any suitable source.

Figure 4:
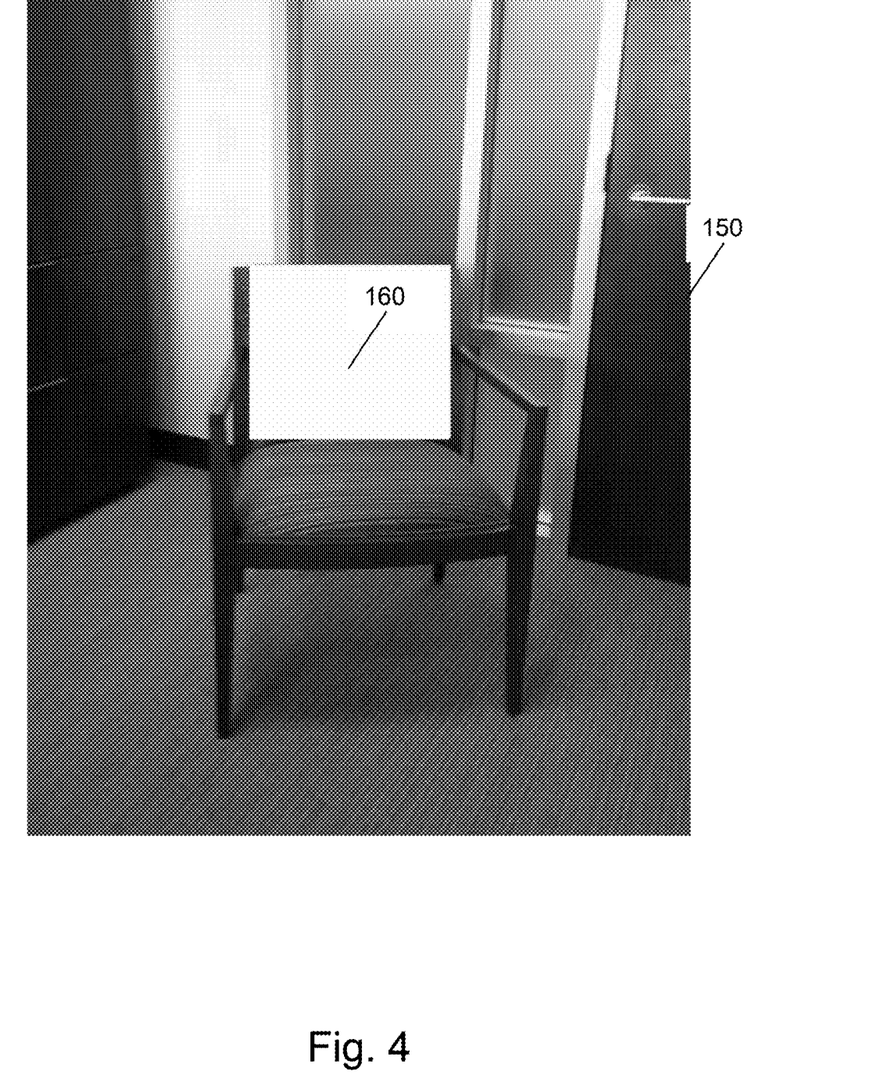
FIG. 4 illustrates the first image of FIG. 3 with a custom view finder.

FIG. 4 illustrates the image 150 as edited by a user to provide a view finder 160. The view finder 160 may be a user defined region through which a user may view an image for capture. As such, in the interests of simplicity, the view finder region shown in FIG. 4 is illustrated as a void. It should be appreciated that the view finder region 160 may be created by a user to have any shape and size, limited only by the bounds of the display and/or image. Generally, all the conventional tools available to in art generation program may be available to a user editing an image to define the view finder region. Specifically, for example, paint brush tools, spray paint type tools, area fill tools, lasso tools, geometric shape tools, and so forth each may be used to define the view finder region. In the present example, the view finder region 160 was defined using a rectangular tool. In some embodiments, more sophisticated tools may also be provided. For example, edge detection tools may be used to define a region. Further, in some embodiments, face detection and or other shape detection tools may be implemented to define the view finder region.

Generally, it should be appreciated that the images shown in FIGS. 3 and 4 are shown as they may appear on the display 106 of the device 100 either for editing or for capturing an image within the view finder region. For example, the image 150 with the view finder 160 may be displayed when the device is in a camera mode and a user may view in real-time what the image 150 will look like when the image is composited with an image captured to fill the view finder region.

Figure 5:
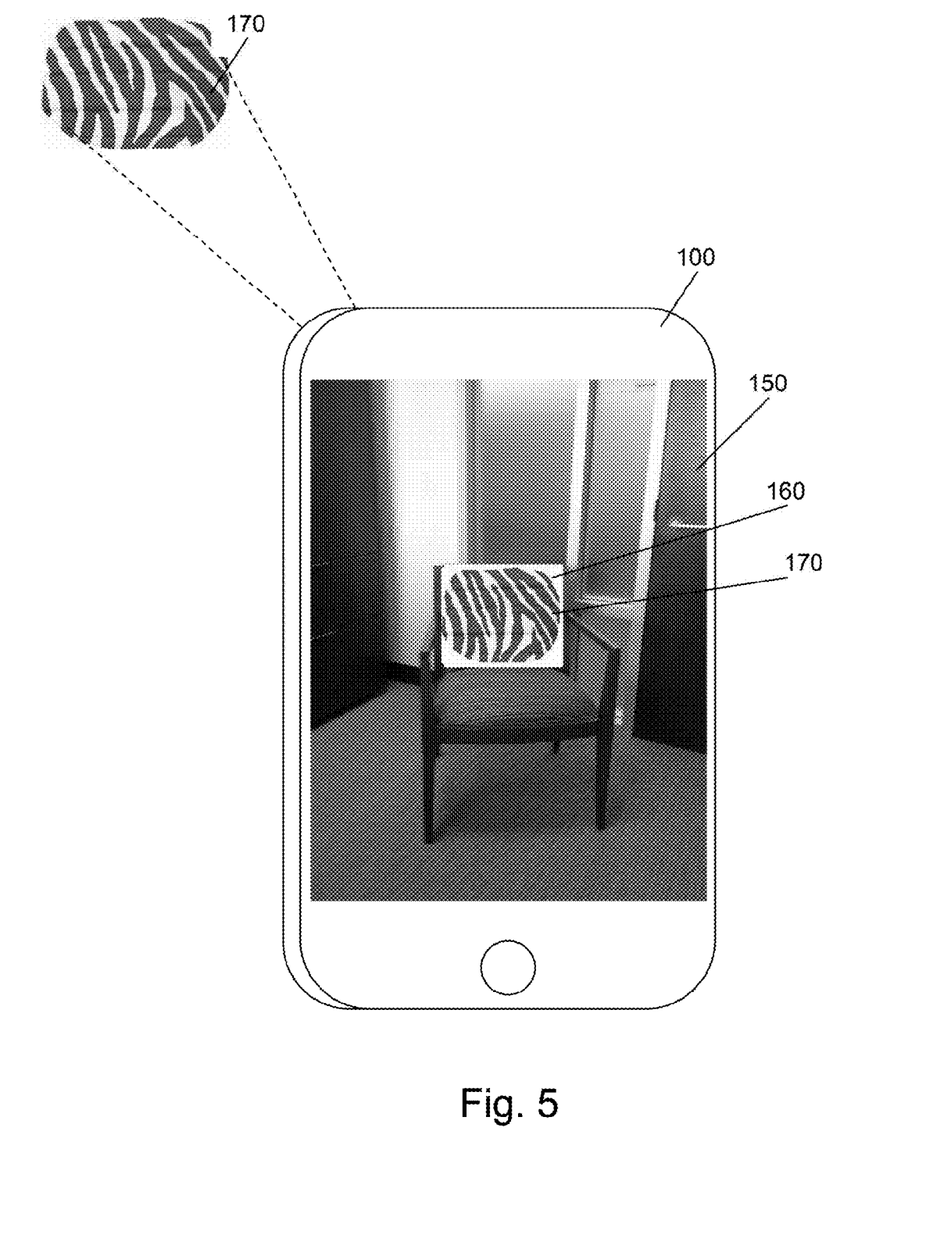
FIG. 5 illustrates the custom view finder of FIG. 4 with a captured second image in the view finder.

FIG. 5 illustrates an example of the device 100 capturing an image and the image appearing in the view finder region 160. Specifically, the view of the camera 110 may be limited to the view finder region 160 of the image 150. While the device 100 is in a camera mode, what the camera sees is displayed in the view finder region 160. In the instant example, a zebra pattern 170 is viewed through the view finder 160. Upon the camera capturing the image, the zebra pattern image is integrated into the image 150 to make a composite image. There is no need for further processing of the images to make the composite image, as the second image may be captured directly within the user defined region.

Conventional approaches to composite two or more images together typically have required a user to interface with multiple different software programs (e.g., a photo capture and photo editing programs) and importing of the images into or out of the different programs. In some cases, an image may be captured by one program, but it has required further editing after capture to properly size, crop or edit the shape of the image for it to work.

In contrast, the instant embodiments provide a real-time camera through a user defined region which advantageously is fast and easy to use. It allows a user to simply select an editing tool, edit an image to define a view finder region and then snap a picture or take a view through the view finder.

Some simple examples further illustrate the present embodiments and potential uses. In a first example, a user may draw a picture of an old-fashioned television-set, replete with rabbit-ear antennae and a channel dial. To insert a real image (or video) into the television, the user defines the display portion of the television as the view finder and then captures images or video using the camera. The captured image is inserted into the artwork, thereby providing a photorealistic image within the display portion of the television.

In a second example, a user has captured an image of a friend making a goofy face and decides to edit the clothing the friend is wearing by defining a view finder region that coincides with the friend's shirt. The user may then view live video through the view finder and pints the camera at some wallpaper. The wallpaper is captured and a composite image is generated with the wallpaper as the friend's shirt.

Figure 6:
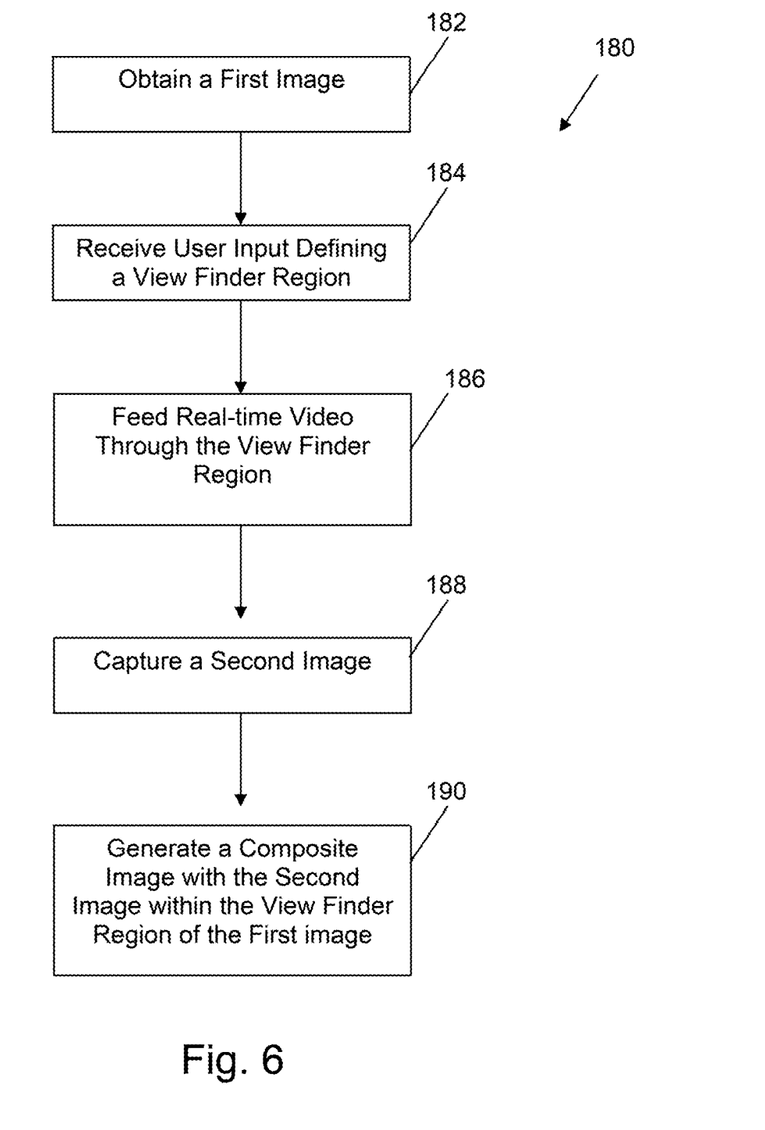
FIG. 6 is a flow chart illustrating an example method for operating a customizable view finder on the device of FIG. 1.

FIG. 6 illustrates and example method 180 related to generating a custom view finder and a composite image. Initially, a first image is obtained (Block 182). The image may be obtained from any suitable source. In some embodiments, it may be an image obtained from a camera or a user generated piece of art. User input is then received to define a view finder region in the first image (Block 184). Real-time video input may be fed through the view finder region (Block 186). The camera may then capture a second image (Block 188) and generate a composite image with the second image occupying the view finder region in the first image (Block 190).

In some embodiments, the first image may take the form of a video image and a view finder may defined within the video image based on a particular location within the video frames or based on the content of the video. For example, a shirt in the video may be defined as the view finder region and the view finder region may move as the shirt moves through the video frames. Additionally, or alternatively, the second captured image may take the form of a video image instead of a still image.

Further, in some embodiments, multiple view finder regions may be defined and/or the view finder region may be separated by portions of the first image. As such, there may be multiple windows that serve as view finders. For example, a first view finder region may be defined on a left-side of the first image and a second view finder region may be defined on the right-side of the first image. In one embodiment, the left side view finder region may be filled with a second image capture event and the right-side view finder region may be filled with a third image capture event. In another embodiment, both the right-side and the left-side view finder regions may be filled with the second image capture. Optionally, each side may be filled with the same image (e.g., a scaled down image of a captured image) or may be filled by different parts of a captured image (e.g., a right-side view finder region filled with the right side of a captured image).

Additionally, in some embodiments, the view finders may be scaled and or moved about within an image. That is, a user may optionally modify a size and/or location of a view finder or window and/or change the shape of the view finder window.

In some embodiments, the method 180 and related methods may be executed within a camera program of the device 100. That is, it may be part of a default executable option for a camera input. In other embodiments, a user may selectively activate it as an application or an add-on to existing camera or device functionality.

Although the foregoing discussion has presented specific examples, persons skilled in the art will recognize that changes may be made in form and detail without departing from the spirit and scope of the examples. Accordingly, the specific examples described herein should be understood as examples and not limiting the scope thereof.

The invention claimed is:

1. A method comprising:
receiving user input defining a view finder region within a first video image having a one or more objects, wherein the view finder region replaces a first object of the one or more objects;
saving the first video image with the view finder region into a non-transitory computer readable medium;
capturing a second image of a second object falling within the view finder region with a digital camera;
compositing the second image into the view finder region of the first image to generate a composite image;
wherein the first object is a moving object within the first video image and the view finder region moves as the first object moves.

2. The method of claim 1 further comprising displaying the first video image with the view finder region on a display of the digital camera.

3. The method of claim 1 further comprising saving the composite image in a non-transitory computer-readable medium.

4. The method of claim 1 further comprising:
capturing the first video image; and
editing the first video image to create the view finder region into which the second image may be captured.

5. The method of claim 4, wherein during capture of the second image, the view finder region displays a capture area of the digital camera, the capture area corresponding to a modified field of view of the digital camera.

6. The method of claim 1, wherein the composite image is generated in real-time.

7. The method of claim 1, wherein the view finder region is created by deleting a region within the first video image corresponding to the first object.

8. The method of claim 1 further comprising performing at least one of a zoom in and a zoom out operation prior to capturing the second image, wherein the first video image with the view finder region remains unchanged by the operation.

9. An apparatus comprising:
a processor;
a non-transitory computer readable medium communicatively coupled to the processor;
a camera communicatively coupled to the processor;
a display communicatively coupled to the processor; and
an input device communicatively coupled to the processor,
wherein the apparatus is configured to:
store a first video image having a plurality of objects;
receive user input to define a view finder region in the first video image, wherein the view finder region replaces a first object of the plurality of objects, and wherein the first object is a moving object within the first video image and the view finder region moves as the first object moves;
display the first video image with the view finder region on the display;
limit a field of view of a camera based on the view finder region; and
capture a composite image using the camera as a composite of the second image within the view finder region of the first video image.

10. The apparatus of claim 9, wherein the input device comprises a touch input device.

11. The apparatus of claim 9, wherein the input device comprises a touch screen display.

12. The apparatus of claim 9, wherein the apparatus is selected from a group including: a cellular phone, a smart phone, a tablet computer, a notebook computer, a desktop computer, or an electronic reader.

13. The apparatus of claim 9 further comprising a communication module to communicate over a network with other electronic devices.

14. The apparatus of claim 9, wherein the camera comprises a digital video camera.

15. The apparatus of claim 9, wherein the second image comprises a video image.

16. The apparatus of claim 11 wherein the apparatus is further configured to:
provide a multiple discrete view finder regions;
capture multiple discrete images; and
composite a captured image into each of the multiple discrete view finder regions upon capture of the multiple discrete images.

17. The method of claim 1 further comprising deleting a portion of the first video image corresponding to the location of the view finder region.

18. The method of claim 17, wherein compositing the second image into the view finder region comprises replacing the deleted portion of the first video image with the second image and integrating the second image and the first video image to generate the composite image.

19. The method of claim 1, wherein the first objects is a moving object within the first video image.

20. The method of claim 19, wherein the view finder region moves as the first object moves.

21. The method of claim 19 wherein the second image is a video image.

* * * * *